Figure 1:
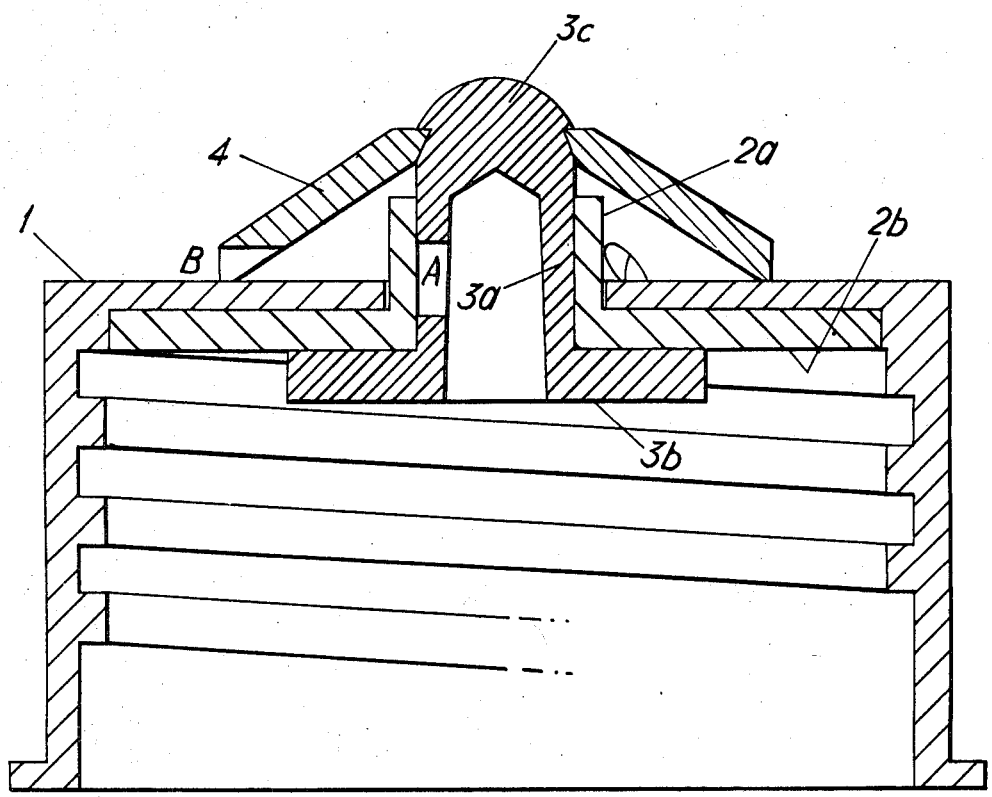

United States Patent

[11] 3,549,040

[72] Inventor Roger Milton
Luton, England
[21] Appl. No. 786,241
[22] Filed Dec. 23, 1968
[45] Patented Dec. 22, 1970
[73] Assignee Plysu Products Limited
Woburn, Bletchley, England
a British Company

[54] VENTED CLOSURE MEMBERS
4 Claims, 2 Drawing Figs.
[52] U.S. Cl. ................................................. 220/44,
215/56
[51] Int. Cl. .................................................. B65d 51/16
[50] Field of Search ...................................... 215/56, 79;
220/44

[56] References Cited
UNITED STATES PATENTS
2,462,445 2/1949 Weiss ........................... 215/56X FOREIGN PATENTS
279,723 11/1927 Great Britain ............... 220/44

Primary Examiner—Raphael H. Schwartz
Attorney—Kemon, Palmer and Estabrook

ABSTRACT: A vented closure device for a container comprises: a closure cap, a resilient disc, and a plastics disc trapping the resilient disc between itself and the inner surface of the cap, all having central apertures, the two discs having coaxial tubes extending from their apertures through the aperture in the cap, the plastics tube having a venting hole under the resilient tube and terminating in a mushroom head; and a conical member engaging the mushroom head and the outer surface of the cap to hold the plastics disc in position and having a venting hole to permit the escape of gases which have passed through the venting hole in the plastics tube.

PATENTED DEC 22 1970
3,549,040
SHEET 2 OF 2
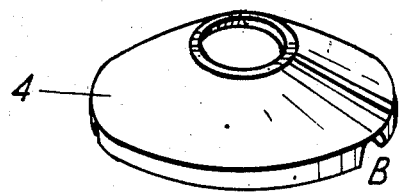
Fig. 2.
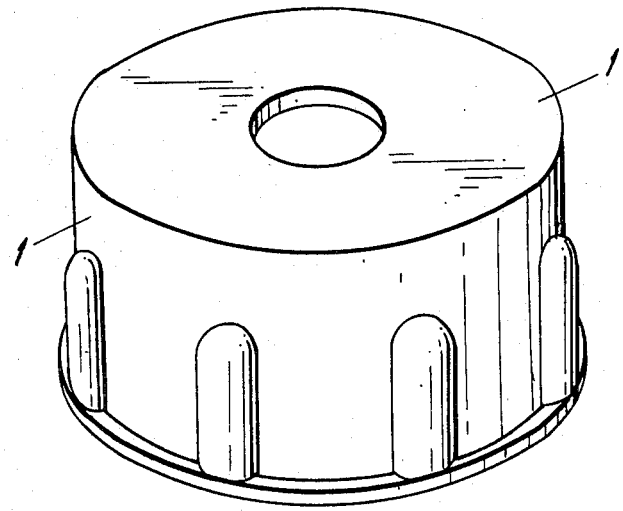
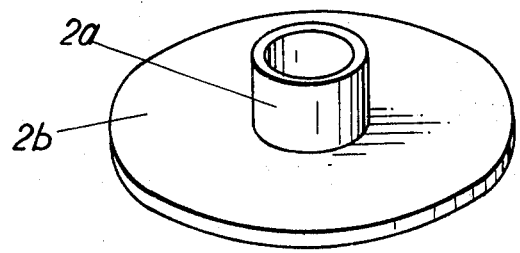
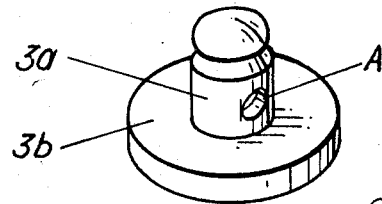
Inventor
Roger Milton
By
Kenyon, Palmer & Estabrook Attorneys

VENTED CLOSURE MEMBERS

Containers which are used for packing chemical products which generate gases must be vented to permit the escape of these gases. It is convenient to provide the vent in the closure member.

According to the present invention, the closure assembly includes, in addition to a closure cap having a central aperture, a resilient sealing member and first and second venting members. The resilient sealing member consists of an apertured disc lying within the cap and a sleeve extending from the disc aperture and passing through the aperture in the cap; the first venting member is of rigid plastics material and consists of an apertured disc, which traps the sealing member between itself and the cap, and a tubular portion extending from its aperture through the said sleeve of the sealing member and projecting from the said sleeve, the tubular portion being closed at its outer end and having a venting hole lying under the said sleeve; and the second venting member, which is formed with a venting hole to permit the escape of gases which have passed through the venting hole in the first venting member, is of rigid plastics material and engages with the projecting end of the tubular portion in such a manner that its outer edge presses against the top of the cap. By pressing against the top of the cap, the second venting member ensures that the first venting member is pulled outwardly through the aperture in the cap and thus ensures that the disc of the first venting member holds the sealing member firmly against the cap. To permit its engagement with the projecting end of the tubular portion, the second venting member may have a central aperture to enable it to snap over the closed end of the tubular portion of the first venting member and engage in a recess in the outer surface of the closed end. The expression "rigid plastics material" is intended to include, for example, high density polyethylene. The resilient sealing member may be ethylene vinyl acetate copolymer and the cap may be formed from polypropylene.

Gases generated within a container provided with such a closure member pass through the hole in the tube or spigot of the first venting member by forcing the resilient sleeve away from this spigot. They are then free to escape to atmosphere through the venting hole or holes in the second venting member. An advantage of this construction is that the resilient venting sleeve and sealing disc are formed in one plastic moulding.

In order that the invention may be better understood, one example of a closure device embodying the invention will now be described with reference to FIG. 1 and 2 of the accompanying drawings, which show respectively a section through this closure device and an exploded view of the device.

In the drawings, an internally screw-threaded closure cap 1 has a central aperture through which passes a sleeve 2a extending from an apertured sealing disc 2b, the parts 2a and 2b being made of resilient material. Within the sleeve 2a is a spigot 3a attached to a further apertured disc 3b. The spigot 3a is closed at its upper end by a mushroom head 3c, i.e. a head with a peripheral recess in its sidewall. The spigot 3a also has a venting hole A lying under the sleeve 2a. The parts 3a and 3b are formed of rigid plastics material and constitute a first venting member.

The second venting member 4 is of conical form with a central aperture. Its inner edge is shaped to snap into the recess in the outer surface of the mushroom head 3c. Its outer edge presses on to the upper surface of the closure cap 1. The second venting member 4 is formed with three notches B at its periphery to permit the escape of gases which have already passed through the port A.

The second venting member 4 is so dimensioned that as a consequence of its engagement between the recess in the mushroom head of the spigot 3a and the closure cap 1, the spigot is forced upwards relative to the closure cap and consequently causes the disc 3b to press the sealing member 2 firmly against the under surface of the top of the cap 1.

I claim:

1. A vented closure device for containers comprising: a closure cap having a central aperture; a resilient sealing member consisting of an apertured disc lying within the cap and a sleeve extending from the disc aperture and passing through the aperture in the cap; a first venting member of rigid plastics material consisting of an apertured disc, which traps the sealing member between itself and the cap, and a tubular portion extending from its aperture through the sleeve of the sealing member and projecting from the said sleeve, the tubular portion being closed at its outer end and having a venting hole lying under the sleeve; and a second venting member of rigid plastics material which engages with the projecting end of the tubular portion in such a manner that its outer edge presses against the top of the cap, the second venting member being formed with a venting hole to permit the escape of gases which have passed through the venting hole in the first venting member by forcing the resilient sleeve of the sealing member away from the tubular portion.

2. A vented closure device in accordance with claim 1, in which the tubular portion of the first venting member is formed with a peripheral recess in its projecting end portion and in which the second venting member has a central aperture to permit it to snap over the projecting end portion of the tubular member and to engage in the said recess.

3. A vented closure device in accordance with claim 1, in which the closure cap is internally screw-threaded.

4. A vented closure device in accordance with claim 1, in which the second venting member is of high density polyethylene.